(12) United States Patent
Mere et al.

(10) Patent No.: US 9,875,019 B2
(45) Date of Patent: Jan. 23, 2018

(54) INDICATING A TRANSITION FROM GESTURE BASED INPUTS TO TOUCH SURFACES

(71) Applicants: Shadi Mere, Ann Arbor, MI (US); Theodore Charles Wingrove, Plymouth, MI (US); Kyle Entsminger, Canton, MI (US)

(72) Inventors: Shadi Mere, Ann Arbor, MI (US); Theodore Charles Wingrove, Plymouth, MI (US); Kyle Entsminger, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 219 days.

(21) Appl. No.: 14/555,194

(22) Filed: Nov. 26, 2014

(65) Prior Publication Data

US 2015/0186031 A1    Jul. 2, 2015

Related U.S. Application Data

(60) Provisional application No. 61/920,993, filed on Dec. 26, 2013.

(51) Int. Cl.
  *G06F 3/048*   (2013.01)
  *G06F 3/0488*   (2013.01)
  *G06F 3/01*   (2006.01)

(52) U.S. Cl.
  CPC .......... *G06F 3/04883* (2013.01); *G06F 3/016* (2013.01)

(58) Field of Classification Search
  CPC .. G06F 3/04883; G06F 3/0416; G06F 3/0488; G06F 3/044; G06F 3/017; G06F 2203/04108
  See application file for complete search history.

(56) References Cited

U.S. PATENT DOCUMENTS

| | | | | |
|---|---|---|---|---|
| 7,834,850 | B2 * | 11/2010 | Boillot | G06F 3/016 345/158 |
| 8,456,448 | B2 * | 6/2013 | Rekimoto | G06F 3/016 345/175 |
| 8,502,651 | B2 | 8/2013 | Birnbaum | |
| 9,026,939 | B2 * | 5/2015 | Smus | G06F 3/038 345/175 |
| 2009/0077504 | A1 * | 3/2009 | Bell | G06F 3/011 715/863 |
| 2009/0309848 | A1 * | 12/2009 | Terada | G06F 3/0425 345/173 |
| 2010/0281440 | A1 * | 11/2010 | Underkoffler | G06F 3/017 715/863 |

(Continued)

FOREIGN PATENT DOCUMENTS

WO    2013/109869 A1    7/2013
WO    2013/151614 A1    10/2013

*Primary Examiner* — Ryan Pitaro
(74) *Attorney, Agent, or Firm* — Dickinson Wright PLLC

(57) ABSTRACT

A system and method for indicating a transition from a gesture based input to a touch surface is provide herein. The system includes a detection monitor coupled to a detection device to detect the transition; and an alert transmitter to alert an output device based on the detection. The gesture based input is a non-contact interface associated with an electronic system, and a touch surface is a contact interface associated with the electronic system.

12 Claims, 4 Drawing Sheets

(56) References Cited

U.S. PATENT DOCUMENTS

| | | | | |
|---|---|---|---|---|
| 2011/0007021 A1* | 1/2011 | Bernstein | ............... | G06F 3/0416 |
| | | | | 345/174 |
| 2011/0148786 A1* | 6/2011 | Day | .................... | G06F 3/04883 |
| | | | | 345/173 |
| 2012/0169671 A1* | 7/2012 | Yasutake | ............... | G06F 3/0425 |
| | | | | 345/175 |
| 2012/0327031 A1* | 12/2012 | Fujioka | ................. | G06F 3/0428 |
| | | | | 345/175 |
| 2013/0257748 A1* | 10/2013 | Ambrus | ............. | G02B 27/0093 |
| | | | | 345/173 |
| 2013/0328833 A1* | 12/2013 | Hsieh | .................... | G06F 3/0428 |
| | | | | 345/175 |
| 2014/0092037 A1* | 4/2014 | Kim | ........................ | G06F 3/041 |
| | | | | 345/173 |
| 2014/0201689 A1* | 7/2014 | Bedikian | ................. | G06F 3/011 |
| | | | | 715/863 |
| 2014/0267031 A1* | 9/2014 | Huebner | ............... | G06F 3/0346 |
| | | | | 345/158 |
| 2014/0292665 A1* | 10/2014 | Lathrop | .................. | G06F 3/013 |
| | | | | 345/173 |
| 2014/0298269 A1* | 10/2014 | Underkoffler | ........... | G06F 3/017 |
| | | | | 715/848 |
| 2014/0344753 A1* | 11/2014 | Akasaka | ............... | G06F 3/0488 |
| | | | | 715/823 |
| 2015/0193124 A1* | 7/2015 | Schwesinger | ........ | G06F 3/04812 |
| | | | | 715/863 |
| 2015/0199101 A1* | 7/2015 | Hwang | ................. | G06F 3/0488 |
| | | | | 715/862 |
| 2015/0338923 A1* | 11/2015 | Grossinger | ............. | G06F 3/017 |
| | | | | 455/566 |
| 2016/0109960 A1* | 4/2016 | Steinle | .................. | G06F 1/1601 |
| | | | | 345/173 |

* cited by examiner

INDICATING A TRANSITION FROM GESTURE BASED INPUTS TO TOUCH SURFACES

CLAIM OF PRIORITY

This patent application claims priority to U.S. Provisional Application Ser. No. 61/920,993, filed Dec. 26, 2013, entitled "Indicating a Transition from Gesture Based Inputs to Touch Surfaces". This patent application contains the entire Detailed Description of U.S. patent application Ser. No. 61/920,993.

BACKGROUND

Interfaces are becoming more complex and dual in nature. Providing multiple ways to interact with a system is becoming more commonplace. Thus, a user of a system may selectively choose a first or second technique for engaging the system. In certain instances, the transition between a first and second technique may require a toggle switch. In other instances, both the first and second techniques may simultaneously be available to the user.

One such input technique is a gesture based input. The gesture based input allows a detection of movement from a cue, such as a body part (commonly the hand), and based on the detected movement or gesture, a command is initiated. The gesture based inputs do not require the user to make contact with a touch, surface, pad, or device.

The gesture is captured via a video camera or motion detector. Accordingly, the video camera captures the movement, correlates the movement to a stored command center (i.e. a processor and storage device), and translates the movement into an action.

Another such input technique is a touch surface. The touch surface allows the user to engage a touch screen or dedicated touch pad, to control a system. The system may be any sort of electronics based system, for example componentry installed in or around the dashboard of a vehicle. The touch screen or surface may employ capacitive touch technology, resistive touch technology, for example.

In certain cases, the gesture based input systems and the touch based input systems may be integrated together. Thus, a user operating a system may selectively engage in either a touch screen or an area earmarked for detecting gestures.

SUMMARY

A system and method for indicating a transition from a gesture based input to a touch surface is provide herein. The system includes a detection monitor coupled to a detection device to detect the transition; and an alert transmitter to alert an output device based on the detection. The gesture based input is a non-contact interface associated with an electronic system, and a touch surface is a contact interface associated with the electronic system.

DESCRIPTION OF THE DRAWINGS

The detailed description refers to the following drawings, in which like numerals refer to like items, and in which.

DETAILED DESCRIPTION

Figure 1:
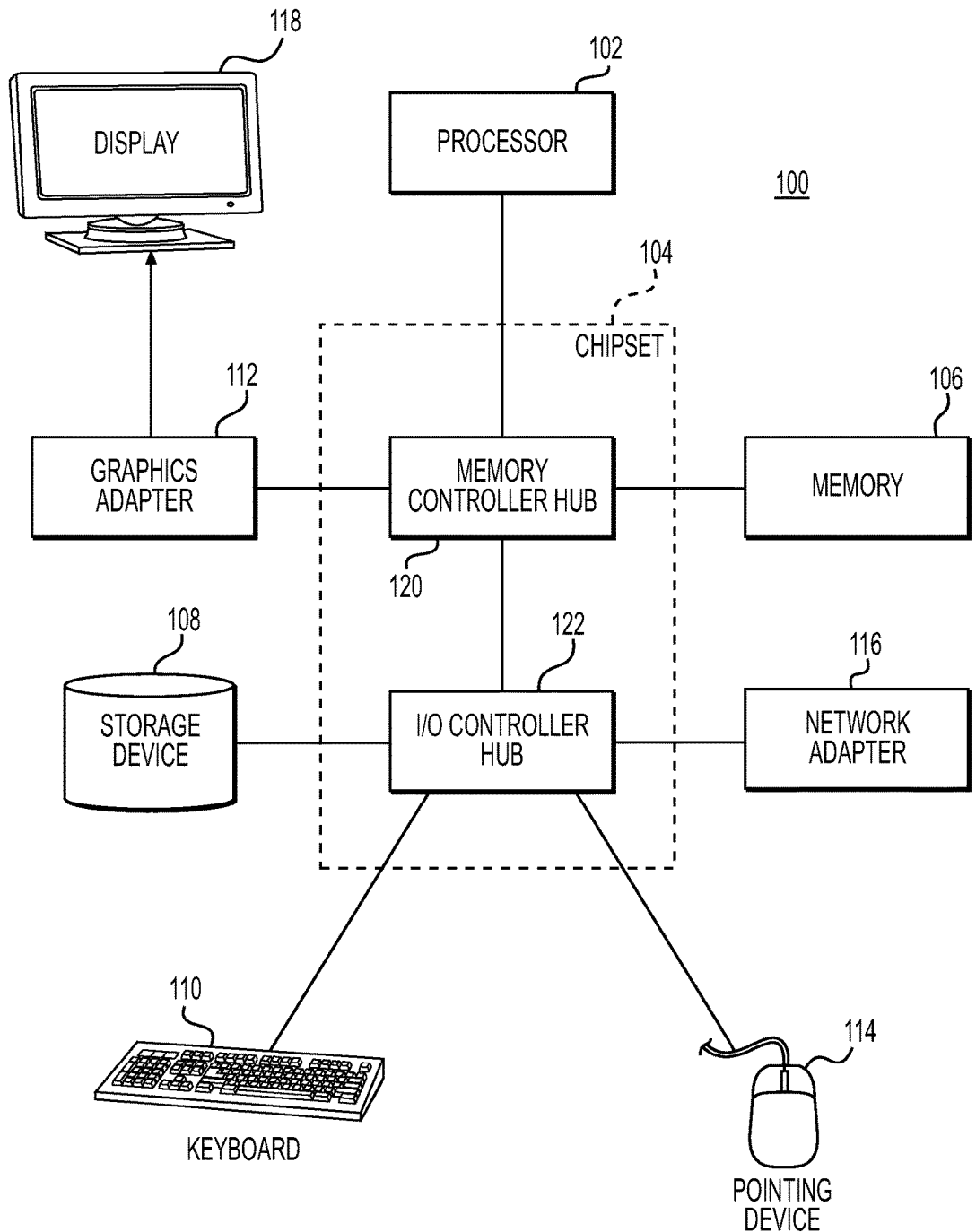
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Gesture based inputs are employed in various situations and contexts. The gesture based input allows for a user or operator to engage with an input or interface without making contact with any surface. The gesture based input is facilitated by a camera or detection technique that allows a gesture to be captured, and a machine or system to be controlled accordingly. The gesture may refer to any portion of a body part that can be controlled and moved. For example, shaking one's hand or pointing a finger may refer to a gesture.

A difficulty with gesture based input systems is that a user may have no sensing or physical knowledge they are in the space required to detect the gesture. Accordingly, an awkward phenomenon of the user trying to navigate to an estimated space may occur. Further, even in cases where a touch pad or surface is implemented, the user may not be cognizant of the area required to effectively engage the touch pad. In cases where the touch pad is implemented in a vehicle, the act of the user removing one's eyesight or attention from the road to a touch pad may be inconvenient and not safe.

In engaging an interface, users and operators often experience feedback associated with touch and physical contact. Accordingly, user's often times expect a haptic sensation. Haptic technology, or haptics, is a tactile feedback technology which takes advantage of the sense of touch by applying forces, vibrations, or motions to the user. A haptic actuator may be embedded in an ergonomically chosen location in the vehicle. An ergonomic location may refer to a place in which the user or operator of the system lays a portion of their person (for example, a seat, an armrest, a wrist placing location).

Disclosed herein are systems and methods for indicating a transition from a gesture based input space to a touch surface. Additionally, the systems and methods disclosed herein may be employed to indicate any sort of approach to either a touch surface or a gesture based input space. Thus, by providing the user of an input system the indication, the user is afforded an enhanced user-experience. The indication may be an audio, visual, haptic, or combination thereof.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server.

Figure 2:
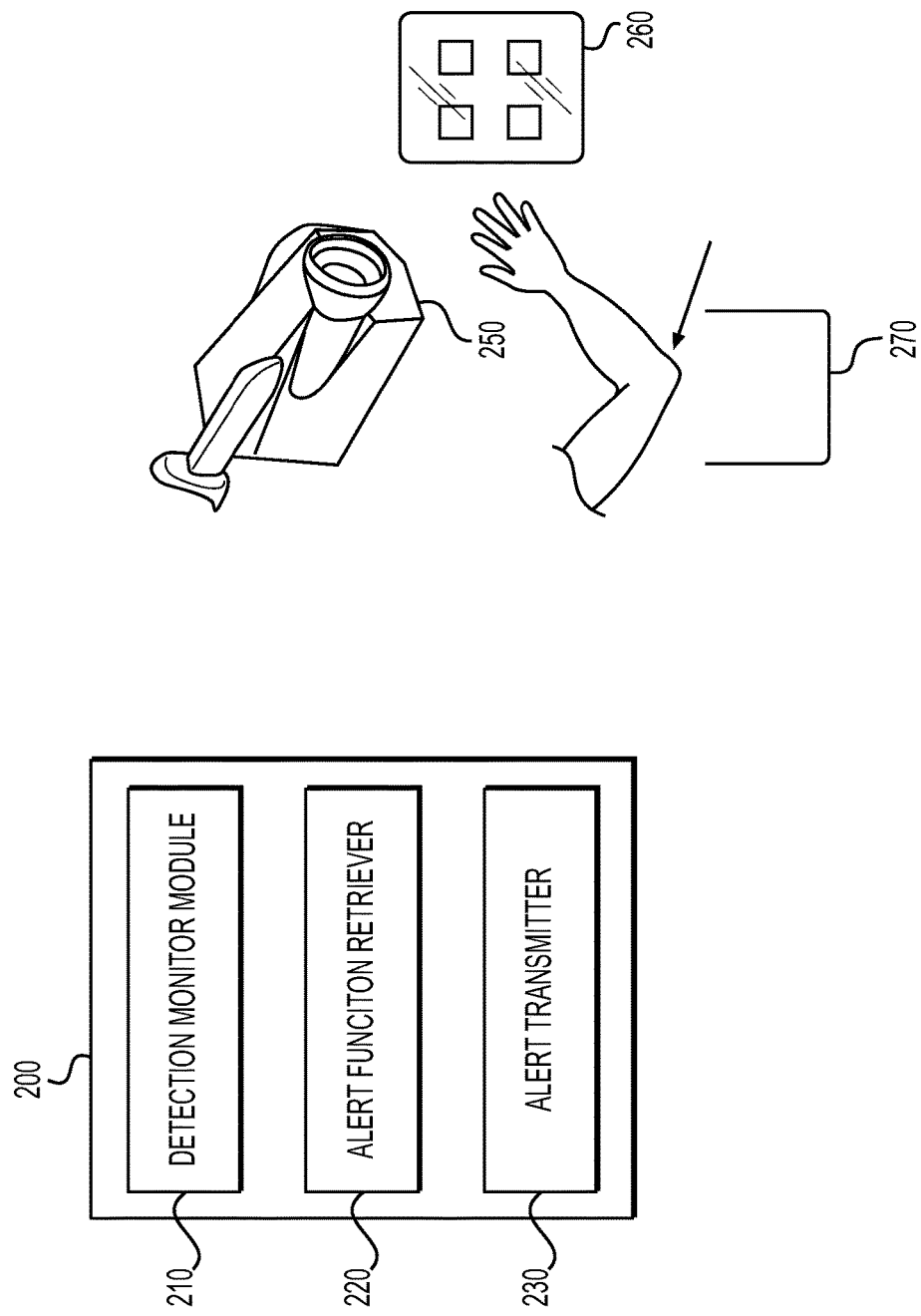
FIG. 2 is an example of a system for indicating a transition from gesture based inputs to a touch surface.

FIG. 2 is an example of a system 200 for indicating a transition from gesture based inputs to a touch surface. The system 200 includes a detection monitor module 210, a retriever 220, and an alert transmitter 230. The system 200 may be implemented on a device, such as computer 100.

The system 200 may be implemented in any environment or situation where a touch or gesture input is employed. For example, the system may be implemented in a vehicle, with the touch pad surface 260 being situated in a dashboard of a vehicle (or any region in which the operator or passenger of the vehicle may engage with).

The system 200 may also communicate with a gesture based input system 250. As shown, the gesture based input system 250 includes a camera. In an implementation of system 200, the camera may be placed in a region directly under and in-front of the touch pad surface 260. Accordingly, when a user approaches the touch pad surface 260, to engage the touch pad surface 260, the gesture based input system 250 may detect the user's hand.

The gesture based input system 250 may solely be employed to detect a hand entering a region associated with the operating of a touch pad surface 260, or alternatively, the gesture based input system 250 may also serve as an input mechanism as well.

The system 200 may be selectively implemented based on a toggle command from a user or implementer of system 200. The toggle command may be stored in a non-volatile memory.

The detection monitor module 210 receives an indication from the gesture based input system 250 that a user's hand has entered a space in which the gesture based input system 250 is configured to monitor. As explained above, this may be a space earmarked as substantially near an area in which a user engages a touch pad surface 260. The detection monitor module 210 may store the indication in a persistent store (such as any of the storage device enumerated above in regards to storage device 108).

The retriever 220 retrieves an alerting function based on the detected indication. The alerting function may be audio, video, haptic, or combinations thereof. The alerting function serves to indicate to a user associated with the touch pad surface 260 and the gesture based input system 250 that a hand or engaging mechanism is about to make contact with the touch pad surface 260.

The alert transmitter 230 transmits the retrieved alerting function to the appropriate mechanism. In certain cases, the alert transmitter 230 may transmit the audio alert to a speaker (for example, a car audio speaker). If the alerting function is a visual cue, alert transmitter 230 may transmit to a display or a light to indicate the retrieved alerting function. In this way, a light or visual cue may indicate that user's hand is in a region associated with interacting with a touch pad surface 260.

In another cases, if the alerting function is a haptic sense, the alerting function may be transmitted to a haptic actuator 270. The haptic actuator 270 may be installed in an ergonomically determined environment. For example, if the system 200 is implemented in a vehicle, the haptic actuator 270 may be implemented in an arm rest, a seat, or any portion of the vehicle that an operator of touch pad surface 260 may make contact with. Accordingly, the haptic actuator 270 may be configured to shake or vibrate in response to a user's hand entering a space or region substantially near an operation area for a touch pad surface 260.

In another example, the alerting function may send an indication to the region of the touch pad surface 260 that is about to be engaged with. Thus, if a hand or gesture approaches a touch pad surface 260, the touch pad surface 260 may be lit up or a display may be presented to the area or region of the touch pad surface 260 about to be engaged.

Figure 3:
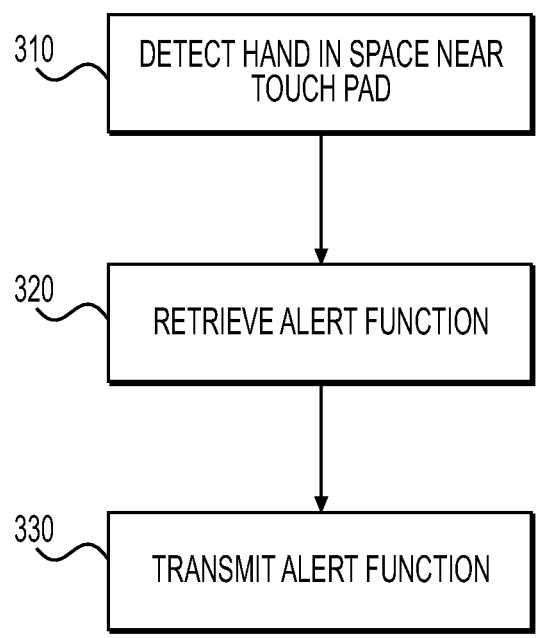
FIG. 3 is an example of a method for indicating a transition from gesture based inputs to a touch surface.

FIG. 3 illustrates a method 300 for indicating a transition from gesture based inputs to a touch surface. The method 300 may be implemented in a system 200.

In operation 310, a detection of a hand or other appendage employed to engage a touch pad or surface is made. The detection may be made via the installation of an image or video capturing device placed under, above, or near the area in which a user is about to engage a touch surface. Accordingly, as the user approaches a touch surface, the device captures the user approaching the touch surface (for example, a hand or appendage being employed to make contact with the touch surface). Employing digital signal processing, the device may ascertain that this corresponds to a user's hand (or other appendage), and accordingly record a detection.

In operation 320, an alert is retrieved. An implementer of method 300 may store a correlation table with various detections and alerts. The alert associated with the detection is stored in a memory.

In operation 330, based on the retrieved alert, the appropriate device for communicating the alert is handshaked with, and accordingly sent an instruction to produce the alert. As explained above, for example, if the alert is an audio, a speaker would be communicated to. In another example, if the alert is a visual cue, a display or lighting element would be communicated to. In one example, a light shining on the appendage may be initiated. In another example, an indicia associated with a display on the touch surface may be initiated or lighted.

In another example, if the alert is a haptic sensation, a haptic actuator may be communicated to.

Figure 4:
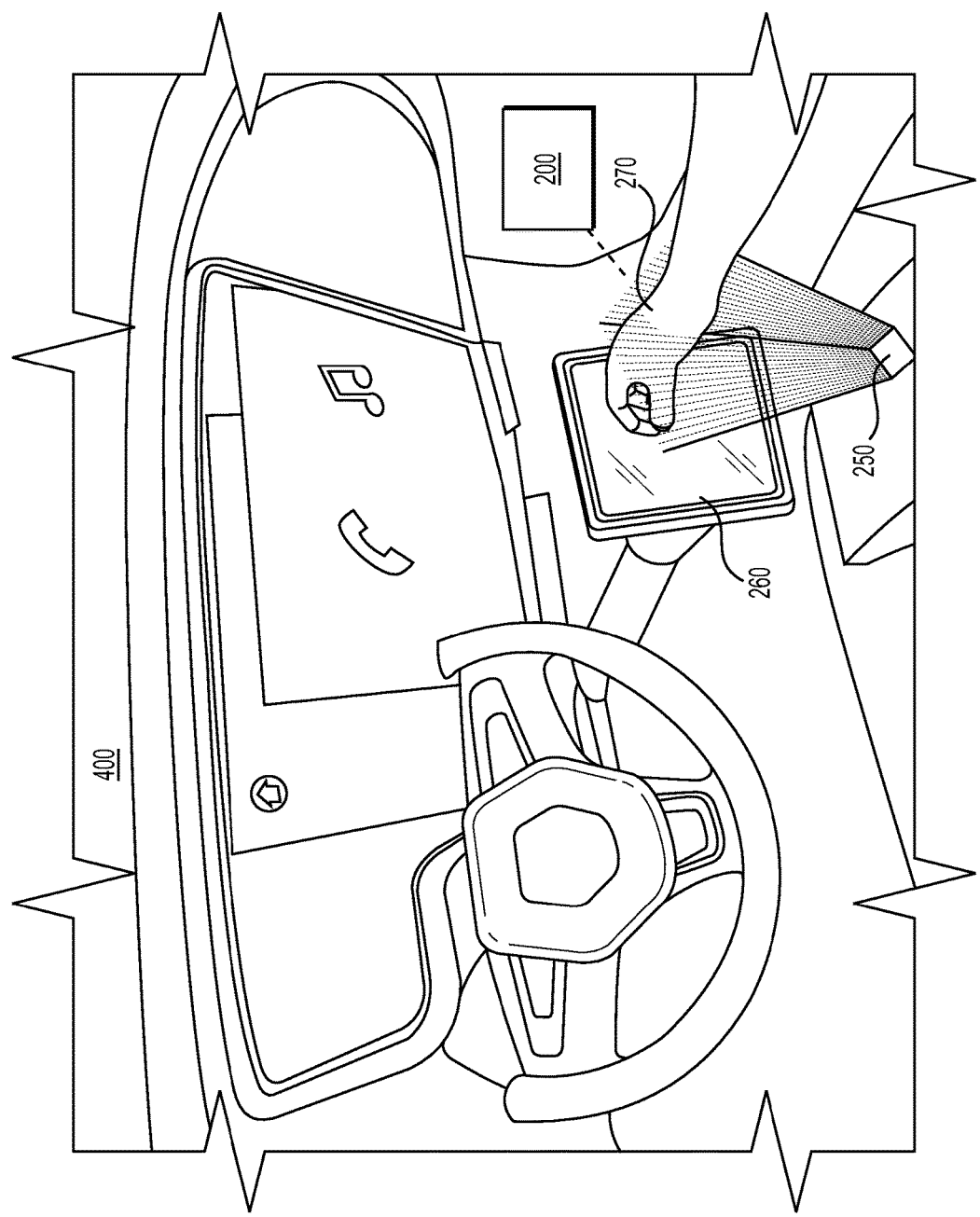
FIG. 4 is an example of system in FIG. 2 being implemented in a vehicle.

FIG. 4 illustrates an example of system 200 being implemented in a vehicle 400.

As shown in FIG. 4, a hand enters into a camera plane 255 area to engage a touch surface 260. The plane 255 area may be predefined to be within a specific location surrounding the touch surface. The touch surface 260 may be associated with the control of an electronic device 410. Not shown is a gesture based input, which may also be associated with the control of the electronic device 410.

In response to the hand entering the camera plane 255 area, a detection that the input mode is transitioning from a gesture-based control (non-contact) to a touch-control (contact) may be made. The detection may be made when the hand 270 enters the plane 255 area. Alternatively, system 200 may detect that the hand 270 is a predetermined distance away from the touch surface 260, and then detect a transition.

Once a transition is detected, various sensory devices in the vehicle (such as an audio, video, or haptic actuator) may be instigated. Each of the sensory devices may be associated with a specific output device. Accordingly, the user associated with the hand is provided a sense-based interaction with the input mechanism installed in the vehicle.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for indicating a transition from a gesture based input to a touch surface, comprising:
    a detection monitor coupled to a detection device to detect the transition;
    an alert transmitter to alert an output device based on the detection; and
    an alert function retriever to retrieve an alert-type, the alert-type being associated with the output device,
    wherein the gesture based input is a non-contact interface associated with an electronic system, and a
    a touch surface is a contact interface associated with the electronic system,
    wherein the alert-type is defined as a visual indication, and
    the visual indication is a projected light on an appendage associated with a touch based input.

2. The system according to claim 1, wherein the detection device is a video capturing device.

3. The system according to claim 2, wherein the video capturing device monitors a predetermined area surrounding the touch surface.

4. The system according to claim 1, wherein in response to an appendage associated with the gesture base input being with a predetermined distance away from the touch surface, the transition is detected.

5. The system according to claim 1, wherein the projected light projects light in a direction substantially parallel to the touch surface.

6. The system according to claim 5, wherein the projected light remains on when an appendage is within a touch-zone, and turns off when the appendage leaves the touch-zone and enters into a gesture-zone.

7. A method for indicating a transition from a gesture based input to a touch surface, comprising:
    detecting an appendage associated with the gesture based input transitioning from a non-contact position to a contact position, the non-contact position being associated with the gesture based input and the contact position being associated with the touch surface;
    transmitting an alert function based on the detection; and
    retrieving an alert function retriever to retrieve an alert-type, the alert-type being associated with the transmitted alert function,
    wherein the alert-type is defined as a visual indication, and
    the visual indication is a projected light on an appendage associated with the gesture based input,
    at least one of the detecting and the transmitting are performed on a processor.

8. The method according to claim 7, wherein the detection is performed via a video capturing device.

9. The method according to claim 8, wherein the video capturing device monitors a predetermined area surrounding the touch surface.

10. The method according to claim 7, wherein in response to the being with a predetermined distance away from the touch surface, the transition is detected.

11. The method according to claim 7, wherein the projected light projects light in a direction substantially parallel to the touch surface.

12. The method according to claim 11, wherein the projected light remains on when an appendage is within a touch-zone, and turns off when the appendage leaves the touch-zone and enters into a gesture-zone.

* * * * *